Patented Aug. 26, 1952

2,608,587

UNITED STATES PATENT OFFICE 2,608,587

PRODUCTION OF β-γ-OLEFINIC ETHERS OF HALOHYDRINS

Rupert C. Morris, Berkeley, and John L. Van Winkle, San Lorenzo, Calif., assignors to Shell Development Company, San Francisco, Calif., a corporation of Delaware No Drawing. Application April 7, 1950, Serial No. 154,716

4 Claims. (Cl. 260—615)

This invention relates to a process for the production of unsaturated halogen-substituted ethers. More particularly, the present invention relates to a process for the production of ethers of beta,gamma-olefinic alcohols with halogen-substituted secondary alcohols by the catalyzed reaction of beta,gamma-olefinic hydrocarbon halides with halogen-substituted epoxide compounds.

The invention of the present application relates to subject matter that is disclosed in the copending application, Serial No. 65,064, filed December 13, 1948, of which this application is a continuation-in-part.

The parent application, above-acknowledged, discloses that certain new and useful unsaturated halogen-substituted ethers, namely, ethers of beta,gamma-olefinic alcohols with bis(halomethyl) carbinols are produced by the reaction under suitable conditions of beta,gamma-olefinic hydrocarbon halides with certain halogen-substituted organic epoxide compounds, the reaction preferably being conducted in the presence of a cupreous catalyst. Illustrative of the products shown in the parent application and prepared according to this method are, among others, the following: allyl bis(chloromethyl) carbinyl ether, which results from the reaction of allyl chloride with epichlorohydrin; methallyl bis(chloromethyl) carbinyl ether, which results from the reaction of methallyl chloride with epichlorohydrin; and 3-chloroallyl bis(chloromethyl) carbinyl ether, which results from the reaction of 1,3-dichloropropene with epichlorohydrin.

It is desirable to have available a process by which these and related unsaturated halogen-substituted ethers can be prepared with maximum efficiency, with minimal conversion of starting materials to products of side reaction, resinous or tarry products, etc., and in a generally efficacious manner.

The provision of such a process is one of the principal objects of the invention of this application.

Further and related objects of the invention will become apparent from the nature of the disclosures hereinafter and in the appended claims.

It has been discovered by the present inventors that, in a process for reacting beta,gamma-olefinic hydrocarbon halides, such as allyl chloride, with halogen-substituted epoxide compounds to produce ethers of beta,gamma-olefinic alcohols with halogen-substituted secondary alcohols, the nature of the materials of construction of which the reaction vessel or equipment, or at least the surface thereof in contact with the reaction mixture, is fabricated or composed, influences noticeably the chemical efficiency of the reaction, the amount of by-products that will be formed, and the general efficacy of the process. In greater particularity, it has been discovered in accordance with the invention of this application, that the reaction of beta,gamma-olefinic hydrocarbon halides with halogen-substituted epoxide compounds can be carried out with higher efficiency, with lower conversion to undesired by-products, tars, resins, and the like, and with generally greater efficacy when the reaction mixture during the execution of the process is kept out of contact with ferromagnetic ferrous metals having a micro-structure other than austenitic, than when it is allowed to come into contact with such ferromagnetic ferrous metals. According to the process of the present invention, ethers of beta,gamma-olefinic alcohols are prepared in an improved manner by heating a mixture of a beta,gamma-olefinic hydrocarbon halide, such as allyl chloride, with a halogen-substituted organic epoxide compound, such as epichlorohydrin, in the presence of a cupreous catalyst, in the liquid state at a reaction temperature in excess of about 125° C., while maintaining the reaction mixture out of contact with ferromagnetic ferrous metals or alloys having other than an austenitic structure. It thus has been discovered that when the reaction vessel or other equipment in contact with the reacting mixture is constructed solely of or is lined with materials other than ferromagnetic ferrous metals or alloys having a non-austenitic structure, markedly higher conversions of the reactants to desired products are obtained than when the reaction mixture is allowed to come into contact during the execution of the process with ferromagnetic ferrous metals or alloys having a non-austenitic structure. Representative ferromagnetic ferrous alloys or steels, which are further characterized by a body-centered cubic crystal structure (ferritic, or "alpha" structure) or by a martensite structure, i. e., by a micro-structure other than austenitic, include, for example, the various carbon steels, certain iron alloys or steels containing one or more alloying metals other than iron, such as the stainless steels designated by the trade as "403" stainless steel (a martensitic iron-chromium alloy containing 11.50% to 13.00% chromium and, ordinarily, traces of carbon, silicon, manganese, sulfur and phosphorous), "501"

stainless steel (a martensitic iron-chromium alloy containing about 4 to 6% of chromium), "420" stainless steel (a martensitic iron-chromium alloy containing 12% to 14% of chromium and about 0.15% or more of carbon), "406" stainless steel (a ferritic stainless steel containing 12% to 14% of chromium and about 3.5% to 4.5% of aluminum) and "443" stainless steel (a martensitic, or ferritic, stainless steel containing 18% to 23% of chromium and 0.90 to 1.25% of copper), as well as certain iron-nickel alloys or nickel steels, such as those having a ferritic structure, e. g., 5% nickel steel and iron-nickel alloys or nickel steels having a higher nickel content below, however, that corresponding to a stable austenitic structure, and which are other than austenitic. In general, the present invention may be stated to be contemplated as comprising carrying out of the reaction between the allyl-type organic halide and the organic epoxide compound under the conditions hereinbefore and hereinafter outlined, while maintaining the reacting mixture out of contact with ferromagnetic alloys having a $\mu n$ (max.), or maximum normal magnetic permeability greater than, say, 250, expressed in c. g. s. m. units, and having a non-austenitic structure, e. g., a ferritic or a martensitic structure.

In accordance with the invention, the reaction vessel or other equipment to be in contact with the reacting mixture comprising the allyl-type organic halide and the halogen-substituted epoxide compound may be constructed of, or at least lined with, various corrosion-resistant non-magnetic ferrous alloys, or of or with a suitable non-ferrous material, for example, a non-ferrous metal or alloy, or a siliceous material, such as porcelain or glass, or a resin. The austenitic stainless steels, particularly the chromium-bearing austenitic stainless steels containing up to about 26% of chromium and lesser amounts of nickel, are included among the preferred materials of construction suitable to the objects of the present invention. These non-magnetic stainless steels are represented by, among others, the following: AISI Type No. 304, an austenitic stainless steel containing 18% to 20% chromium and 8% to 11% of nickel; AISI Type No. 308, an austenitic steel containing more chromium and nickel than Type 304; AISI Types Nos. 316 and 317, austenitic stainless steels containing chromium, nickel and molybdenum; and type 303, a free-machining 18-8 type steel. Nickel metal, while ferromagnetic, is nonferrous and may be used as the material of construction. Suitable alloys of nickel include, for example, the 62Ni-30Mo-5Fe alloy known to the trade as Hastelloy B, the 57Ni-20Mo-20Fe alloy known as Hastelloy A, the 80Ni-14Cr-6Fe alloy known to the trade as Inconel, and the 58Ni-22Cr-6Cu-6Mo-6Fe wrought alloy commonly referred to as Illium "R." Alloys containing predominant amounts of non-ferrous metals other than nickel may also be used, e. g., alloys of lead, cadmium, chromium, silver, etc., and in appropriate cases the reaction equipment may be constructed of or lined with the pure metals themselves.

The following examples will illustrate the invention and various features thereof. It will be appreciated that specific embodiments other than those described in the examples are possible and will be apparent from the present disclosures.

*Example I*

This example consists of two experiments, one of which is carried out according to the invention. Both experiments relate to the reaction of epichlorohydrin and allyl chloride.

In the first experiment, there is employed a steel autoclave constructed largely of types 304 and 316 stainless steels, but having exposed to contact with the reaction mixture a small amount of mild carbon steel, which is a non-austenitic ferromagnetic steel. To the autoclave there are charged 93 parts by weight of allyl chloride, 102 parts by weight of epichlorohydrin and, as catalyst, for every 100 parts of the resulting mixture about 1.6 parts by weight of copper foil 2 mils thick. The autoclave is closed and heat is applied. At the end of one hour the temperature has been brought to 100° C. and the pressure has risen to 70 pounds per square inch. After two hours, the temperature is 150° and the pressure is 180 pounds per square inch. Thereafter the temperature is held at 150–185° C. A sample withdrawn after a total of 3½ hours heating shows a lower content of epoxide groups, expressed as equivalents of epoxide groups per 100 grams of the reaction mixture, than does the original mixture. The lower content of epoxide groups indicates formation of desired product. After four hours heating, it is found that the pressure has risen to 800 pounds per square inch. Shortly thereafter the rupture disc bursts at a pressure of about 3100 pounds per square inch. Upon opening, the autoclave is found to contain largely finely-divided and granular carbonaceous material.

In the second experiment of this example, the same procedure is followed except that the autoclave that is used is one constructed wholly of non-magnetic stainless steels (types 304 and 316). The allyl chloride, epichlorohydrin, and copper foil are charged to the autoclave, which is then closed and heated with stirring at about 155° C. for 18 hours. During this time, the pressure developed within the autoclave drops gradually from its initial value of 130 pounds per square inch to about 40 pounds per square inch. The autoclave then is cooled and the contents, a clear fluid mixture, fractionally distilled. Allyl 1,3-dichloro-2-propyl ether is recovered in conversions of 54% and 59% based upon the amounts of allyl chloride and epichlorohydrin, respectively, charged to the autoclave. On the basis of the amounts of the reactants, the yield of desired product is better than 85%.

The results of these two experiments, when compared, illustrate the advantage of conducting the reaction in a vessel, at least the interior surfaces of which are devoid of ferromagnetic ferrous alloys having other than an austenitic structure. Equivalent results will be obtained when there is substituted for the allyl chloride used in these experiments other beta,gamma-olefinic hydrocarbon halides, such as allyl bromide, crotyl chloride, methallyl chloride, 1,3-dichloropropene, 2-isopropyl-3-chloro-1-propene, 1-chloro-2-pentene, 3-bromo-2-hexyl-1-propene, 3-chloro-1-cyclohexene, cinnamyl chloride, allylidene chloride, and the like. Halogen-substituted organic expoxide compounds other than epichlorohydrin, and containing 1,2 epoxide groups, include epihalohydrins, such as epibromohydrin, beta-methylepichlorohydrin, alpha,-alpha'-dimethyl-epibromohydrin, 3,4-epoxybutane and 1-bromo-

Example II

This example likewise consists of two experiments, one of which is carried out according to the teachings of the invention.

In the first experiment there is charged to an autoclave constructed of ferromagnetic carbon steel 1030 parts of epichlorohydrin, 970 parts of allyl chloride, 2 parts of copper foil 2 mils thick, and 3 parts of cuprous chloride. The autoclave is provided with pressure gauge, thermometer, mechanical stirrer and a bursting disc as a safety precaution against the development of excess pressures. The autoclave is closed and heated with stirring of the contents at about 150° C. for about 8 hours. The autoclave then is cooled, the contents withdrawn and fractionally distilled. In addition to unreacted allyl chloride and epichlorohydrin, there are obtained large amounts of polymeric material and of glycerol dichlorohydrin with only small amounts of desired allyl 1,3-dichloro-2-propyl ether.

In the second experiment, which is carried out under conditions equivalent to those used in the first, there is employed a nickel-lined autoclave which is otherwise similar to the steel autoclave used in the first experiment. The reaction temperature is 160° C. and the reaction time is 24 hours. At the end of the reaction period the autoclave is cooled, the contents are withdrawn and fractionally distilled. Allyl 1,3-dichloro-2-propyl ether is recovered in the distillate in an amount corresponding to a conversion of 54% based upon the amount of epichlorohydrin charged. The yield, based upon the amount of epichlorohydrin consumed, is 71%, while on the basis of the amount of allyl chloride consumed the yield is better than 98%.

The feature to which the present invention relates is applicable generally in the synthesis of beta,gamma-olefinic ethers of halogen-substituted epoxy-free alcohols by reaction of beta,gamma-olefinic hydrocarbon halides with halogen-substituted organic epoxide compounds. Such halogen-substituted organic epoxide compounds may contain 1,3-epoxy or 1,4-epoxy groups or they may contain 1,2-epoxy groups, the 1,2-epoxy organic epoxide compounds being ordinarily employed and preferred. From the standpoint of availability of the epoxide compound and desirability of the product, epihalohydrins wherein the epoxide group is a 1,2-epoxy group containing in the epoxy ring a —$CH_2$— group and having a halogen-substituted methyl group directly linked to the other carbon atom of the epoxide ring, are of particular interest. The preferred epoxide compounds may be represented by the formula

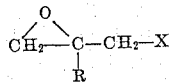

in which X represents an atom of halogen, preferably bromine or chlorine, and R represents a hydrogen atom or a hydrocarbon group, such as alkyl (e. g., methyl, ethyl, propyl, isopropyl, butyl, isobutyl, t-butyl, the pentyl groups, the hexyl groups, etc.). The beta,gamma-olefinic hydrocarbon halides which are reacted with halogen-substituted organic epoxide compounds in accordance with the invention contain at least one atom of a halogen, preferably bromine or chlorine, which is directly linked to a saturated carbon atom which, in turn, is directly linked to one of two carbon atoms that are directly interconnected by an olefinic bond. The saturated carbon atom to which the halogen atom is directly linked may be a primary carbon atom (directly linked to only one carbon atom), a secondary carbon atom (directly linked to two atoms of carbon), or it even may be a tertiary carbon atom (directly linked to three atoms of carbon), although it is in general preferred to employ the beta,gamma-olefinic hydrocarbon halides of the primary type. The feature of the process to which the invention relates is applicable to the reaction of the following beta-gamma-olefinic hydrocarbon halides (among others) with halogen-substituted organic epoxide compounds in the presence of cupreous catalysts: allyl chloride, allyl bromide, methallyl chloride, methallyl bromide, crotyl chloride, crotyl bromide, 2-ethyl-3-chloro-1-propene, 2-ethyl-3-bromo-1-propene, 2-ethyl-3-bromo-1-propene, 2-isopropyl-3-chloro-1-propene, 2-n-propyl-3-bromo-1-propene, 1-chloro-2-pentene, 1-bromo-3-methyl-2-pentene, 1-chloro-2-ethyl-2-butene, 1-bromo-2-isobutyl-2-butene, 1-chloro-2-pentyl-2-pentene, 1-chloro-2-butyl-3-methyl-2-butene, 1-bromo-2-ethyl-3-methyl-2-butene, 1-chloro-2-tetradecene, 3-bromo-1-butene-4-chloro-2-hexene, 3-chloro-1-cyclohexane, 3-bromo-1-cyclohexene, 1,4-dichloro-2-butene, and their various homologs and analogs.

The reaction between the beta,gamma-olefinic hydrocarbon halide and the halogen-substituted epoxide compound is effected by heating a mixture of the selected reactants in liquid phase at an elevated temperature in the presence of a cupreous catalyst. The temperature may be varied within reasonable limits. The lowest temperature generally suitable is about 100° C., and temperatures of at least 130° C. are preferred. While in some instances temperatures as high as 350° C. may be employed, preferred temperatures are those below about 250° C. The pressure that is used will be sufficient to maintain the reaction mixture in liquid state. While in some cases atmospheric or even subatmospheric pressures will satisfy this requirement, in many cases superatmospheric pressures will be required. The pressure conveniently may be the autogenous pressure that rises when the reaction mixture is heated in a vessel that is closed from the atmosphere. However, superatmospheric pressures may be applied by the introduction of an inert gas under pressure into the reaction vessel.

The beta,gamma-olefinic hydrocarbon halide and the epoxide compound preferably are employed in amounts corresponding to approximately equimolar amounts of the two reactants. A moderate excess of the halogen-substituted epoxide compound relative to the beta,gamma-olefinic hydrocarbon halide is desirable. Generally speaking, amounts of the two reactants corresponding to mole ratios of olefinic halide: organic epoxide compound of from about 10:1 to about 1:10 may be used, a preferred range being mole ratios of from about 2:1 to about 1:2. The presence of solvents ordinarily is not required, although suitable inert solvents may be included in the reaction mixture, as when one of the reactants is a gas, or a solid at the reaction temperature, and it would be convenient to handle such reactant in the form of a solution rather than in the pure state.

As the cupreous catalyst there may be employed metallic copper or various compounds of copper, such as inorganic and organic salts thereof. Suitable compounds of copper include, for example, the bromides, the chlorides, and the iodide, copper sulfate, copper nitrate, copper borate, azurite, cuprous carbonate, copper acetate, copper naphthenate, copper benzoate, copper palmitate, copper silicate, as well as organic copper-containing complexes, e. g., cuprous chloride-tributylphosphite complex. The copper or copper compound may be added as such to the reaction mixture or in other cases it may be carried upon or in a solid supporting material. The amount of catalyst may be from about 0.05 to about 50%, preferably from about 0.5% to about 10% by weight of the reactants. The complex copper-containing insoluble residue formed in small amounts during the reaction of the beta,gamma-olefinic hydrocarbon halide with the halogen-substituted organic epoxide compound in the presence of an added copper or inorganic compound of copper may be used as catalyst in succeeding runs.

The process may be carried out in a batchwise, an intermittent, or a continuous manner.

The beta,gamma-olefinic ethers of halogen-substituted alcohols, produced in accordance with the process of the invention, are useful in a variety of technically valuable applications. They are valuable chemical intermediates, e. g., for the preparation of ethers of beta,gamma-olefinic alcohols with polyhydric alcohols, such as glycerol, by replacing halogen by hydroxide. Products obtainable by the process of the present invention also are of interest and may be used as biologically active compounds and as precursors of biologically active compounds. The products of the present process are also useful as resin intermediates. The feature to which the present invention relates enables the more efficient and economical production of these useful organic compounds.

We claim as our invention:

1. In a process wherein allyl chloride and epichlorohydrin are caused to react to produce the allyl ether of glycerol alpha,gamma-dichlorohydrin by heating in liquid mixture at a temperature of from about 130° C. to about 250° C. in the presence of a cupreous catalyst, the feature which comprises conducting the process with the reaction mixture in a vessel the inner surfaces of whcih are devoid of ferromagnetic ferrous alloys having a micro-structure other than austenitic.

2. In a process wherein a beta,gamma-olefinic hydrocarbon halide is caused to react with a halogen-substituted organic epoxide compound to produce a beta,gamma-olefinic ether of a halogen-substituted epoxide-free alcohol containing the same number and arrangement of carbon atoms as said epoxide compound and one more atom of halogen, by heating in liquid mixture at a temperature of from about 100° C. to about 350° C. in the presence of a cupreous catalyst, the feature which comprises conducting the process with the reaction mixture in a vessel the inner surfaces of which are devoid of ferromagnetic ferrous alloys having a micro-structure other than austenitic.

3. In a process for the production of allyl 1,3-dichloro-2-propyl ether by the reaction in liquid phase of allyl chloride with epichlorohydrin in the presence of a cupreous catalyst, the feature which comprises conducting the reaction with the reaction mixture contained in a reaction vessel at least the inner surfaces of which, in contact with the reaction mixture, are devoid of ferrous metals having other than an austenitic structure and having a maximum normal magnetic permeability, $\mu_n$ (max), greater than about 250, expressed in c. g. s. m. units.

4. In a process wherein a beta,gamma-olefinic hydrocarbon halide is caused to react with an organic epoxide compound to produce a beta,-gamma-olefinic ether of a halogen-substituted epoxide-free alcohol containing the same number and arrangement of carbon atoms as said epoxide compound and one additional atom of halogen, the feature which comprises conducting the reaction with the reaction mixture contained in a reaction vessel at least the inner surfaces of which, in contact with the reaction mixture, are devoid of ferrous metals having other than an austenitic structure and having a maximum normal magnetic permeability, $\mu_n$ (max), greater than about 250, expressed in c. g. s. m. units.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,236,919 | Reynhart | Apr. 1, 1941 |
| 2,437,866 | Vance et al. | Mar. 16, 1948 |